UNITED STATES PATENT OFFICE.

ABRAHAM BRODSKY, OF DETROIT, MICHIGAN.

BEVERAGE.

1,280,150. Specification of Letters Patent. Patented Oct. 1, 1918.

No Drawing. Application filed February 16, 1917. Serial No. 148,946.

*To all whom it may concern:*

Be it known that I, ABRAHAM BRODSKY, a citizen of the Dominion of Canada, and residing at Detroit, in the county of Wayne and State of Michigan, have invented a new and Improved Beverage, of which the following is a specification.

This invention relates to the manufacture of non-alcoholic beverages, and its object is to provide a healthful, nourishing beverage having a pleasantly bitter-sweet taste, which shall have high thirst-quenching properties, and which can be manufactured at low cost.

A pleasant bitter-sweet taste is given to this beverage by a blending of the bitterness of aloes, hops, Spanish bitter-orange rinds, American worm-wood and gentian; and by blending the sweetness of sugar, black molasses and glucose. The proportions of each one of the materials employed may be varied within quite wide limits when the others are kept in substantially the proportions indicated.

About one-half pound of hops, one-half pound of the rinds of Spanish bitter-oranges, one-fourth pound of gentian, three ounces of aloes and four ounces of American worm-wood are each boiled separately in about two quarts of water. These liquids are then strained and added to forty gallons of water. About twenty five pounds of sugar, one-fourth pound of citric acid, one quart of black molasses and two quarts of glucose syrup are added to the water before or after the boiled liquids are added. About four ounces of brewers' yeast are added to the mixture and it is allowed to stand in an open container for from twenty four to forty eight hours, after which it is filtered and bottled. In case the alcohol resulting from the use of the yeast is objectionable, the yeast may be omitted.

A portion of the sugar may be "burnt" to change the normally pale yellow color to light or dark brown, even carrying the shade to almost black. The amount of sugar will be varied according as the demand is for a fairly bitter or a fairly sweet beverage. The aloes, while contributing to the exact shade of bitterness desired, act as a mild laxative and counteract the tendency of many non-alcoholic beverages to cause constipation. The bitter-orange rind and gentian are also appetizers and so serve to counteract the tendency of the sugar to cause a feeling of fullness. The amount of citric acid may be varied considerably according to the tastes of the purchasing public.

The yeast seems to act upon the glucose and on the molasses, particularly the former, and a layer of foam at the top of the glass may be increased or diminished according to the amount of glucose and yeast employed. The foam is normally thick and creamy.

I claim:—

1. A beverage composed of liquids formed by boiling bitter vegetable substances including hops and bitter-orange rinds in water, and about ten per cent. by weight of sugar.

2. A beverage composed of liquids formed by boiling bitter vegetable substances including hops, bitter-orange rinds and aloes in water, and acidulated and sweetened water.

3. A beverage composed of liquids formed by boiling bitter vegetable substances including aloes, hops, bitter-orange rinds, wormwood and gentian and straining the liquids, about eighty times as much water, and about ten per cent. of the weight of the water in sugars.

4. A beverage having a bitter-sweet taste consisting of water and extracts of aloes, gentian, bitter-orange rinds, and wormwood, sugar and yeast to cause the liquid to foam.

ABRAHAM BRODSKY.